(12) United States Patent
Seesselberg et al.

(10) Patent No.: US 8,681,184 B2
(45) Date of Patent: Mar. 25, 2014

(54) DISPLAY UNIT, AND DISPLAYING METHOD FOR THE BINOCULAR REPRESENTATION OF A MULTICOLOR IMAGE

(75) Inventors: Markus Seesselberg, Aalen (DE); Johannes Ruoff, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 1177 days.

(21) Appl. No.: 12/598,755

(22) PCT Filed: Mar. 7, 2008

(86) PCT No.: PCT/EP2008/001843
§ 371 (c)(1),
(2), (4) Date: Nov. 3, 2009

(87) PCT Pub. No.: WO2008/135110
PCT Pub. Date: Nov. 13, 2008

(65) Prior Publication Data
US 2010/0134534 A1     Jun. 3, 2010

(30) Foreign Application Priority Data
May 4, 2007     (DE) .................. 10 2007 021 036

(51) Int. Cl.
| | |
|---|---|
| G09G 1/28 | (2006.01) |
| G09G 5/00 | (2006.01) |
| G09G 3/28 | (2013.01) |
| H04N 9/47 | (2006.01) |
| H04N 5/225 | (2006.01) |
| H04N 5/64 | (2006.01) |
| G02F 1/1335 | (2006.01) |
| G02F 1/1333 | (2006.01) |
| G02F 1/13 | (2006.01) |
| G03B 21/00 | (2006.01) |
| G02B 5/32 | (2006.01) |
| G02B 27/02 | (2006.01) |
| G02B 27/64 | (2006.01) |
| G02B 27/42 | (2006.01) |
| G02B 27/30 | (2006.01) |

(52) U.S. Cl.
USPC ............. 345/690; 345/8; 345/63; 345/22; 345/32; 348/54; 348/57; 348/344; 348/739; 348/744; 349/8; 349/11; 349/56; 349/71; 349/201; 353/31; 353/34; 359/641; 359/16; 359/480; 359/556; 359/558

(58) Field of Classification Search
USPC .............. 345/7–8, 31–32, 36, 48, 63, 77, 84, 345/690–691, 694, 72, 83, 204–207, 20, 22, 345/213, 66, 90; 348/40–41, 739, 744, 348/54–57, 70, 276–277, 355, 344, 383; 349/8, 106, 201, 5–7, 9–13, 56–57, 349/61–64, 71, 78, 80, 97, 112–113, 154, 349/158, 193; 353/82, 84, 7–8, 28–31, 34, 353/37, 48, 89; 359/1, 13, 15, 16, 19, 28, 359/34–35, 227, 237, 242, 281, 292, 407, 359/443, 480, 554–556, 563, 567, 577, 558, 359/581, 641, 642, 726, 800, 482, 484.06
See application file for complete search history.

(56) References Cited

U.S. PATENT DOCUMENTS

| | | |
|---|---|---|
| 4,711,512 A | 12/1987 | Upatnieks |
| 5,682,255 A | 10/1997 | Friesem et al. |
| 5,966,223 A | 10/1999 | Friesem et al. |
| 6,882,479 B2 | 4/2005 | Song et al. |
| 6,943,955 B2 | 9/2005 | Kaschke et al. |
| 2004/0109234 A1 | 6/2004 | Levola |
| 2004/0165778 A1* | 8/2004 | Cartlidge et al. ............. 382/211 |
| 2004/0184156 A1 | 9/2004 | Gunn, III et al. |
| 2006/0018014 A1* | 1/2006 | Niv et al. ...................... 359/407 |
| 2006/0018019 A1* | 1/2006 | Niv et al. ...................... 359/566 |

FOREIGN PATENT DOCUMENTS

| | | |
|---|---|---|
| DE | 103 16 534 A1 | 11/2004 |
| DE | 601 22 658 T2 | 12/2006 |
| EP | 1 217 846 A2 | 6/2002 |
| JP | 09-146046 | 6/1997 |
| WO | WO 99/52002 | 10/1999 |
| WO | WO 01/09663 A1 | 2/2001 |

| | | | |
|---|---|---|---|
| WO | WO 03/081320 A1 | 10/2003 | |
| WO | WO 2006/038744 A1 | 4/2006 | |
| WO | WO 2007/036936 A1 | 4/2007 | |
| WO | WO 2007/141589 A1 | 12/2007 | |

OTHER PUBLICATIONS

Schmitz, Martin, et al., "Gratings in the resonance domain as polarizing beam splitters," *Optics Letters*, vol. 20, No. 17, pp. 1830-1831 (Sep. 1, 1995).

Levola, Tapani, "Diffractive optics for virtual reality displays," *Journal of the Society for Information Display—SID*, vol. 14, No. 4, pp. 467-475 (2006).

Levola, Tapani, "Novel Diffractive Optical Components for Near to Eye Displays," *Article 7.1 for SID International Symposium 2006*, San Francisco (California, USA), Jun. 2006.

Printout of http://en.wikipedia.org/wiki/LC-Displays, prior to Nov. 4, 2009.

* cited by examiner

*Primary Examiner* — Wesner Sajous

(74) *Attorney, Agent, or Firm* — Patterson Thuente Pedersen, P.A.

(57) ABSTRACT

A display unit for binocular representation of a multicolor image including a control unit triggering an imaging element such that the imaging element generates in a temporal successive manner the image to be displayed for a first beam path and a second beam path as a first image and second image, respectively. The images are generated in a pre-distorted manner, opposite of the chromatic aberration of the respective beam path, such that the chromatic aberration generated in the respective beam path is compensated when the first and second image is displayed. The display unit includes a switching module which operates in temporal synchrony with the first and second image being generated, such that a user can see the first image only via the first beam path and the second image only via the second beam path.

14 Claims, 4 Drawing Sheets

400; US 8,681,184 B2

DISPLAY UNIT, AND DISPLAYING METHOD FOR THE BINOCULAR REPRESENTATION OF A MULTICOLOR IMAGE

PRIORITY CLAIM

The present application is a National Phase entry of PCT Application No. PCT/EP2008/001843, filed Mar. 7, 2008, which claims priority from German Application Number 102007021036.3, filed May 4, 2007, the disclosures of which are hereby incorporated by reference herein in their entirety.

FIELD OF THE INVENTION

The present invention relates to a display unit and a displaying method for the binocular representation of a multicolor image. Such a unit is frequently arranged as an HMD apparatus (head-mounted-display apparatus) which should be as small and compact as possible.

BACKGROUND

Such a unit with a single imaging element and a transparent substrate arranged as a plane-parallel plate with a diffractive injection element and a first and second diffractive extraction element which are arranged at a distance from one another is described in T. Levola: "Diffractive optics for virtual reality displays", Journal of the SID 14/5 (2006), pages 467 through 475. The diffractive injection element is used for binocular beam path splitting and the diffractive extraction elements are used among other things for enlarging the exit pupil of the optical system of the described display unit in comparison to the exit pupil of a collimation lens arranged between the imaging element and the plate.

The disadvantageous aspect in the described unit is that as a result of the diffractive injection element and the diffractive extraction elements different chromatic aberrations are impressed on the image for the right eye and the left eye of the user. Chromatic aberrations shall be understood here as being especially so-called field-dependent binocular color cast which occurs for the reason that the light energy impinging on the eye pupil from a pixel of the imaging element depends on the position of the pixel in the imaging element and on the wavelength, and is in addition different for the right and left eye of the user. This leads to the consequence according to the state of the art that one and the same pixel is perceived with different brightness in each eye depending on the color. The user thus perceives an image with different color distortion in each eye ("field-dependent binocular color cast"). Since the substrate with the injection element and the diffractive extraction elements are arranged as symmetrically as possible, the color defect perceivable by the user is mirrored. When the user perceives a red color cast at the right edge of the image in the right eye, he automatically perceives a red color cast at the left edge of the image in the left eye.

SUMMARY OF THE INVENTION

It is therefore an object of the invention to provide a display unit for binocular representation of a multicolor image which can be arranged in an extremely compact manner and simultaneously produces the lowest possible chromatic aberration.

This is achieved in accordance with the invention by a display unit for binocular representation of a multicolor image comprising a single imaging element, by means of which the multicolor image that is to be represented can be generated, and a projection lens system that is provided with a collimation lens and a transparent substrate which is located behind the collimation lens and encompasses a diffractive injection element and a first and second diffractive extraction element arranged at a distance from each other, further comprising a control unit for triggering the imaging element, a first beam path which extends from the imaging element to the first extraction element via the collimation lens and the injection element through the substrate, and via the first extraction element out of the substrate (in proper use of the display unit up to the first eye of the user), and a second beam path that extends from the imaging element to the second extraction element via the collimation lens and the injection element through the substrate, and via the second extraction element out of the substrate (in proper use of the display unit up to the second eye of the user), with different chromatic aberrations being generated in the first and second beam path because of the injection element and the extraction elements, with the control unit triggering the imaging element in such a way that the imaging element generates in a temporal successive manner the image to be displayed for the first beam path and the second beam path as a first image and second image, respectively, in a pre-distorted manner, opposite of the chromatic aberration of the respective beam path in such a way that the chromatic aberration generated in the respective beam path is compensated when the first and second image is displayed, and with the display unit comprising a switching module which ensures that, in temporal synchrony with the first and second image being generated, a user can see the first image only via the first beam path and the second image only via the second beam path.

It is thus ensured in accordance with the invention in the binocular display unit that a user can always only perceive the image to be displayed only via one of the two beam paths. This is used in such a way that the image for the respective beam path is generated by the imaging element in such a color-distorted manner that the color defect is corrected in total in the projection via the beam path. A color correction can thus be performed although the chromatic aberrations of the two beam paths are different. If the image to be represented were to be displayed simultaneously via the two beam paths, one could always correct only one of the two different color defects of the two beam paths by a respective pre-distorted image generation.

The display unit in accordance with the invention can thus be used to correct the undesirable field-dependent binocular color cast which is caused by the transparent substrate with the injection element which is used for binocular beam path splitting and the extraction elements.

The control unit preferably controls the imaging element in such a way that both images can be perceived in a quasi simultaneous manner as a result of inertia in the optical perception for the user. In addition, it is possible to switch back and forth between the two beam paths with a frequency higher than 10 Hz for example (especially with a frequency in the range of 25 to 100 Hz).

The imaging element can be a self-luminous imaging element or a non-self-luminous imaging element. In particular, the imaging element can be an LCD module, an LCoS module or an OLED module. It is further possible that the imaging element is arranged as a tilting mirror matrix.

The substrate is especially arranged in such a way that the light from the imaging element is guided in the first and second beam path in the substrate each by internal total reflection. For this purpose, the substrate can be arranged as a planar plate.

The switching module can comprise a triggerable stop in the first and second beam path each, which stop is switched over synchronously to the generation of the respective first and second image between blocking and passing. The stop can be arranged as a mechanical stop. It is further possible to achieve the switching effect via polarization effects.

When an LCD module or an LCoS module or any other imaging element is used which emits polarized light, two orthogonal linear polarization states can be used to switch over between blocking and passing. It is also possible to use any other orthogonal polarization states. When an imaging element is used for example which emits unpolarized light such as an OLED, this light can be polarized by series-connecting a polarizer, and the same apparatus is thus used.

Blocking can be realized by means of the stop for example in such a way that the light is absorbed or is extracted from the beam path.

In the display unit, the switching module may comprise a polarization element located behind the imaging element which maintains the first polarization state of the light coming from the imaging element or changes to a second polarization state and a λ/2 plate which is arranged in one of the two beam paths between the imaging element and the injection element, with the injection element being arranged in such a way that it injects or transfers only light of the first or second polarization state into the respective beam path. Light of the other polarization state is extracted from the beam path by means of the injection element. It is thus possible in a simple way to cause the desired changeover between the two beam paths.

The polarization element can be located in front of or behind of the λ/2 plate. The polarization element can principally be arranged at any location between the imaging element and the injection element. The λ/2 plate is preferably arranged close to or in the pupil of the collimation lens. As a result, the injection element can be disposed for example in the exit pupil of the collimation lens and the λ/2 plate sufficiently close to the exit pupil of the collimation lens.

It is further possible that the switching module comprises a polarization element which is located behind the imaging element and which ensures that the polarization state of the first image is different in relation to the polarization state of the second image, with the injection element being arranged in such a way that only light of the first polarization state is transferred into the first beam path and only light of the second polarization state into the second beam path. A highly compact display unit can thus be realized. The injection element can have a predetermined structure for this purpose which does not change over time. It is also possible that the injection element is arranged as an electrically switchable diffractive optical element. In this case, the injection element is switched synchronously to the generation of the first and second image.

The object is further achieved by a displaying method for binocular representation of a multicolor image for a display unit, comprising a single imaging element, by means of which the multicolor image that is to be represented can be generated, and a projection lens system that is provided with a collimation lens and a transparent substrate which is located behind the collimation lens and encompasses a diffractive injection element and a first and second diffractive extraction element arranged at a distance from each other, a first beam path which extends from the imaging element to the first extraction element via the collimation lens and the injection element through the substrate, and via the first extraction element out of the substrate, and a second beam path that extends from the imaging element to the second extraction element via the collimation lens and the injection element through the substrate, and via the second extraction element out of the substrate, with different chromatic aberrations being generated in the first and second beam path because of the injection element and the extraction elements, with the imaging element being triggered in such a way in the method that it successively generates the image to be displayed for the first beam path and the second beam path as a first image and second image, respectively, in a pre-distorted manner, opposite of the chromatic aberration of the respective beam path in such a way that the chromatic aberration generated in the respective beam path is compensated when the first and second image is displayed, and it is ensured that, in synchrony with the first and second image being generated, a user can see the first image only via the first beam path and the second image only via the second beam path.

It is thus possible with this method to maintain the chromatic aberration of the respective beam path in the image generation of the first and second image, so that the chromatic aberration caused by the beam path is compensated in the representation of the image via the respective beam path.

The light is guided preferably by internal total reflection in the substrate in the first and second beam path. For this purpose, the substrate can be arranged as a planar plate for example.

In the method, one triggerable stop can be arranged in the first and second beam path each which is changed over synchronously between blocking and passing to the generation of the respective first and second image. The stop can be a mechanical stop. It is also possible that the stop can switch over between blocking and passing by means of polarization effects. It is further possible that the stop itself changes the polarization state of the light, so that consequently the desired effect is achieved.

Furthermore, a polarization element can be located in the method behind the imaging element, with the polarization element maintaining the first polarization state of the light coming from the imaging element or changing the same in a second polarization state, and a λ/2 plate can be arranged in one of the two beam paths between the imaging element and the injection element, with the injection element being arranged in such a way that it only transfers light of the first or second polarization state in the respective beam path. A simple changeover between the two beam paths is thus possible with these steps. The polarization element can be located in front of or behind the λ/2 plate.

It is alternatively possible that a polarization element is located behind the imaging element, which polarization element ensures that the polarization state of the first image differs from the polarization state of the second image, with the injection element being arranged in such a way that only light of the first polarization state is transferred into the first beam path and only light of the second polarization state into the second beam path. This is easy to realize and leads to a highly compact display unit.

It is understood that the features as mentioned above and those yet to be explained below can be used not only in the stated combinations but also in other combinations or alone without leaving the framework of the present invention.

BRIEF DESCRIPTION OF THE DRAWINGS

The invention is now explained in closer detail by way of examples by reference to the enclosed drawings which also disclose features relevant to the invention, wherein.

DETAILED DESCRIPTION

Figure 1:
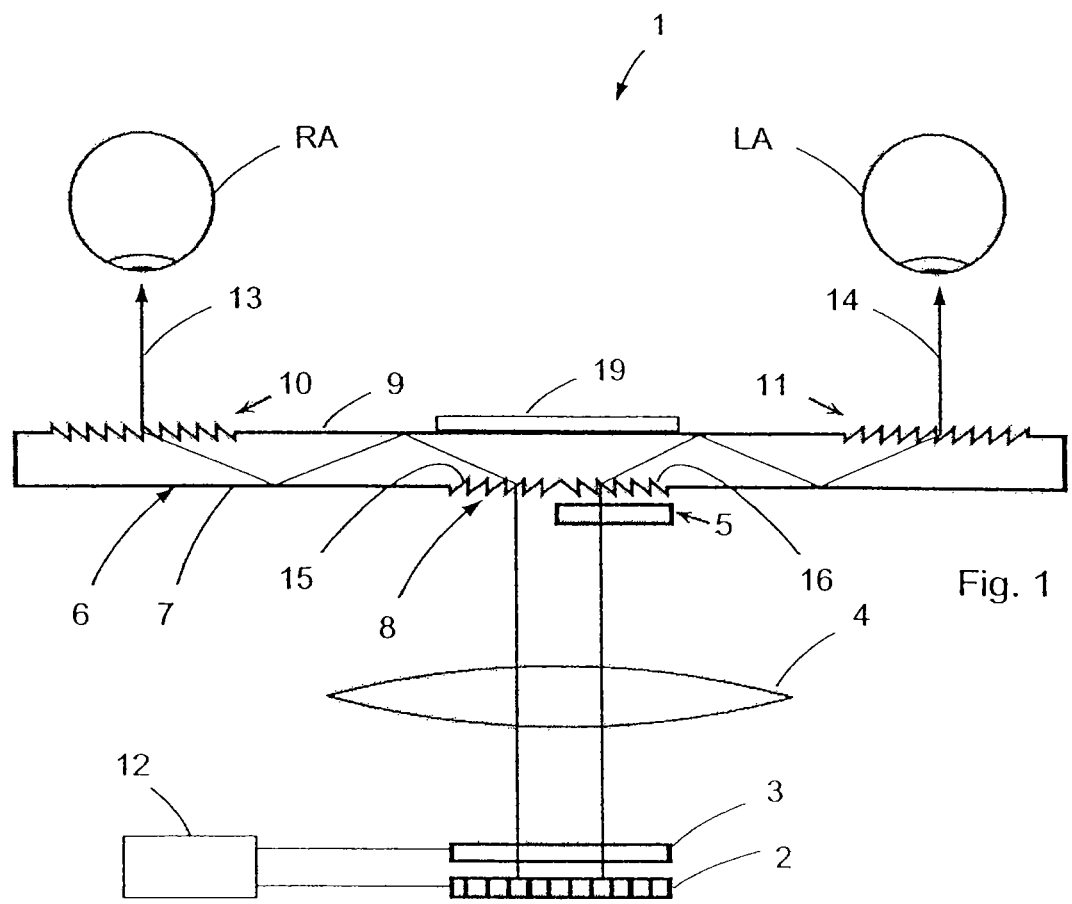
FIG. 1 depicts a first embodiment of the display unit in accordance with the invention for binocular representation of a multicolor image.

In the embodiment as shown in FIG. 1, the display unit 1 for binocular representation of a multicolor image comprises an imaging element 2, after which are located, in this sequence, a switchable polarization element which is arranged here as a liquid crystal element 3, a collimation lens 4, a λ/2 plate 5 and a transparent planar plate 6. The planar plate 6 comprises a diffractive injection element 8 on its side 7 facing the imaging element 2 and two mutually spaced diffractive extraction elements 10, 11 on its side 9 opposed from the imaging element 2. The injection and extraction elements 8, 10 and 11 each always have the same groove spacing. Furthermore, a control unit 12 for triggering the imaging element 2 and the liquid crystal element is provided. It is understood that the sequence of the elements could also be different. For example, the collimation lens (4) and the liquid crystal element (3) could be exchanged with each other. The liquid crystal element can also be positioned directly in front of or behind the λ/2 plate (5).

FIG. 1 shows a first beam path 13 for a right eye RA of the user of the display unit 1 which is for example arranged as an HMD unit (head-mounted display unit) and a second beam path 14 for the left eye LA of the user, schematically illustrated by respective arrow lines, with the user being capable in accordance with the invention, as will be explained below in closer detail, of perceiving in an alternating fashion the image generated with the imaging element 2 only with the right eye RA and only with the left eye LA.

As is shown in the schematic representation in FIG. 1, the first beam path 13 extends from the imaging element 2 through the liquid crystal element 3 and the collimation lens 4 and meets the diffractive injection element 8 which diffracts a desired diffraction order (here the $+1^{st}$ diffraction order) to the left (as seen in FIG. 1) in such a way that the light is guided by internal total reflection in the planar plate 6 up to the first extraction element 10 which extracts the light in the direction towards the right eye RA out of the planar plate 6.

In the second beam path 14, the light of imaging element 2 passes through the liquid crystal element 3 and the collimation lens 4 and the λ/2 plate 5 and is diffracted by means of the diffractive injection element 8 to the right (as seen in FIG. 1) in such a way (here the $-1^{st}$ diffraction order) that it is guided in the planar plate 6 by means of internal total reflection up to the second extraction element 11 from which it is extract from the planar plate 6 in the direction towards the left eye LA.

In order to realize this different injection into the planar plate 6 for the first and second beam path, the diffractive injection element 8 comprises a first subgrating 15 which is not covered by the λ/2 plate 5 and diffracts the TE-polarized light into the diffraction order m=+1 to the left (as seen in FIG. 1), and a second subgrating 16 which is covered by the λ/2 plate 5. Both subgratings 15, 16 have the same groove spacing as the extraction elements 10, 11. The second subgrating 16 is arranged in such a way that it diffracts TE-polarized light mainly into the diffraction order m=−1 (to the right in FIG. 1). Furthermore, both subgratings 15 and 16 are arranged in such a way that they diffract TM-polarized light mainly in the diffraction order m=0.

The surface structure of the injection element 8 and the extraction elements 10, 11 shown in zigzag arrangement may correspond to the surface structure of the elements 8, 10 and 11. It is understood that the surface structure of the elements 8, 10 and 11 can also be different than shown here. The relevant aspect is that the described diffractive effect is realized.

The planar plate 6 can be made of plastic or glass, with a material being preferable which offers the highest possible refractive index, so that the critical angle of total reflection within the plate 6 is as small as possible. The refractive index of the material should be smaller than 2 because otherwise further undesirable diffraction orders could arise.

As a result of the diffractive injection element 8 and the diffractive extraction elements 10 and 11, different chromatic aberrations are generated in the first and second beam path 13 and 14 which are clearly perceivable for the user, with the produced chromatic aberrations of the two beam paths 13 and 14 frequently being such that they are mirrored towards each other for the right and left eye RA, LA.

In order to compensate these chromatic aberrations caused by the diffractive elements 8, 10 and 11, the display unit 1 is operated in accordance with the invention in such a way that the user can perceive the image generated on the imaging element 2 either only with his right eye RA (i.e. via the first beam path 13) or only with his left eye LA (i.e. via the second beam path 14), with the changeover between the two beam paths 13 and 14 being caused via the polarization state of the light emitted by the imaging element 2. At the same time, the imaging element 2 is triggered by means of the control unit 12 in such a way that it generates the image to be represented in a chromatically pre-distorted manner depending on the respective beam path 13 and 14 in such a way that the chromatic aberration caused by the respective beam path 13, 14 is compensated.

Figure 2:
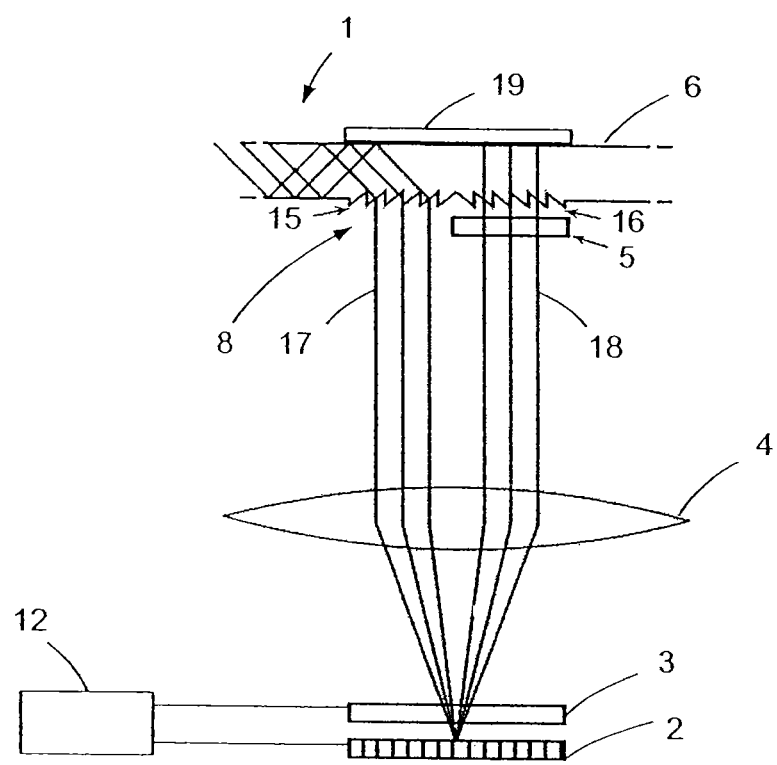
FIG. 2 depicts an enlarged view of a section of the unit of FIG. 1 for explaining the first switching state.

It is assumed that the imaging element 2 emits the generated multicolor image as TE-polarized light. The liquid crystal element 3 is triggered by the control unit 12 in such a way at first that it does not change the polarization state of the light emitted by the imaging element 2, so that the collimation lens 4 projects TE-polarized light to infinity, as schematically indicated in FIG. 2. The exit pupil of the collimation lens 4 lies close to the injection grating 8, so that the collimated light of each pixel of the imaging element 8 impinges upon the injection grating 8. The collimation lens 4 can consist not only of one single lens, but can also comprise several single lenses, one or several cemented elements and/or at least one diffractive element.

As a result of the configuration of the diffractive injection element 8 as described above, the light 17 which is collimated by the collimation lens 4 and which impinges directly on the diffractive injection element 8 and thus on the first subgrating 15 as TE-polarized light is diffracted into the diffraction order m=+1. This light 17 is guided to the extraction element 10 via the internal total reflection in the planar plate 6 (FIG. 1), which extracts the same in the direction to the right eye RA.

The collimated light 18 which passes through the λ/2 plate 5 (FIG. 2) has a TM polarization state after passing the λ/2 plate 5, so that it is diffracted by the second subgrating 16 into the zeroth diffraction order and thus passes through the planar plate 6 in a straight fashion. This light 18 can be caught for example by a vignetting stop 19, so that it will not reach an eye RA, LA of the user.

In this state, the user can thus perceive the image generated by the imaging element 2 only via the first beam path 13. This is utilized in accordance with the invention in such a way that the imaging element 2 chromatically generates the image to be produced under control of the control unit 12 in a pre-distorted manner as a first image against the chromatic aberration of the first beam path 13, through which the chromatic aberration caused in the first beam path 13 is compensated for the user and he is able to perceive the first image in a color-corrected manner with his right eye RA. No light reaches the left eye LA of the user from the second beam path 14, so that the user will not perceive an image with his left eye.

Figure 3:
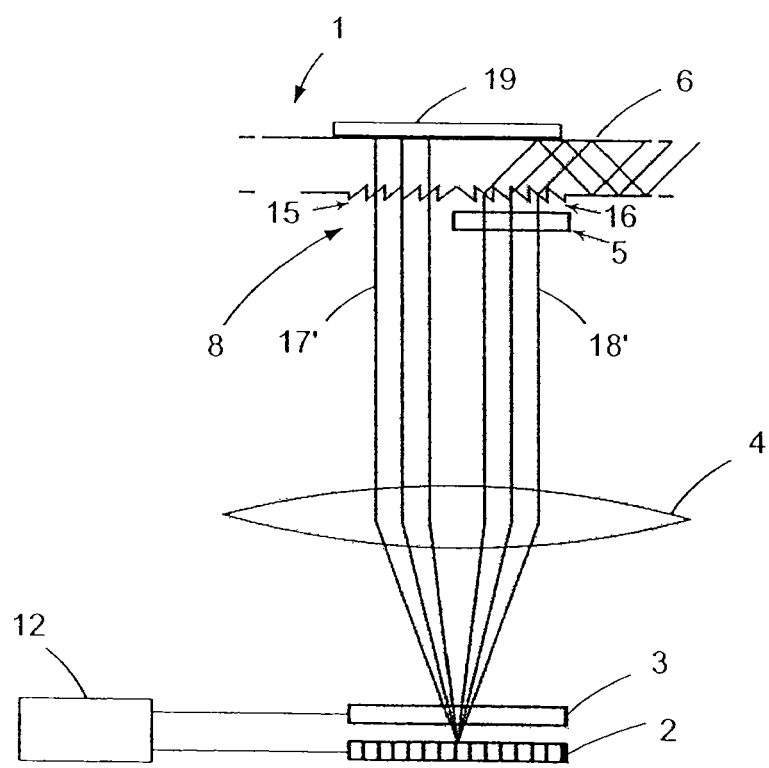
FIG. 3 depicts an enlarged view of a section of the unit of FIG. 1 for explaining the second switching state.

The control unit 12 switches after a predetermined period of time from the first state as shown in FIG. 2 to the second state as shown in FIG. 3, in which the liquid crystal element 3 changes the polarization state of the TE-polarized light from the imaging element 2 to the TM polarization state, so that the collimation lens 4 will now project TM-polarized light to infinity. This leads to the consequence that the portion 17' of the collimated TM-polarized light which impinges directly on the diffractive injection element 8 or the first subgrating 15 is diffracted into the zeroth diffraction order and thus passes through the planar plate 6 and is caught again by the vignetting stop 19. The TM-polarized light 18' passing through the $\lambda/2$ plate is converted into TE-polarized light as a result of the $\lambda/2$ plate, so that it is diffracted by the second subgrating 16 of the diffractive injection element 8 into the diffraction order $m=-1$ to the right (in FIG. 3). The light thus diffracted is guided by means of internal total reflection in the planar plate 6 up to the second extraction element 11 which extracts the same from the planar plate 6 to the left eye LA of the user (FIG. 1).

Furthermore, the control unit 12 triggers the imaging element 2 in the state as shown in FIG. 3 in such a way that the multicolor image generated by means of the imaging element 2 is chromatically pre-distorted as a second image in such a way that the chromatic aberration produced by the second subgrating 16 and the diffractive extraction element 11 is compensated. The user therefore perceives a color-corrected image through his left eye LA. The user does not perceive any picture through his right eye RA in the state as shown in FIG. 3.

The user seems to perceive the multicolor image in a color-corrected manner with both eyes simultaneously by rapid switching back and forth between the first and the second state of FIGS. 2 and 3. The control unit 12, the liquid crystal element 3 and the $\lambda/2$ plate 5 thus form a switching module which switches in an alternating fashion between the first and second beam path as a projection beam path of the display unit 1.

Figure 4:
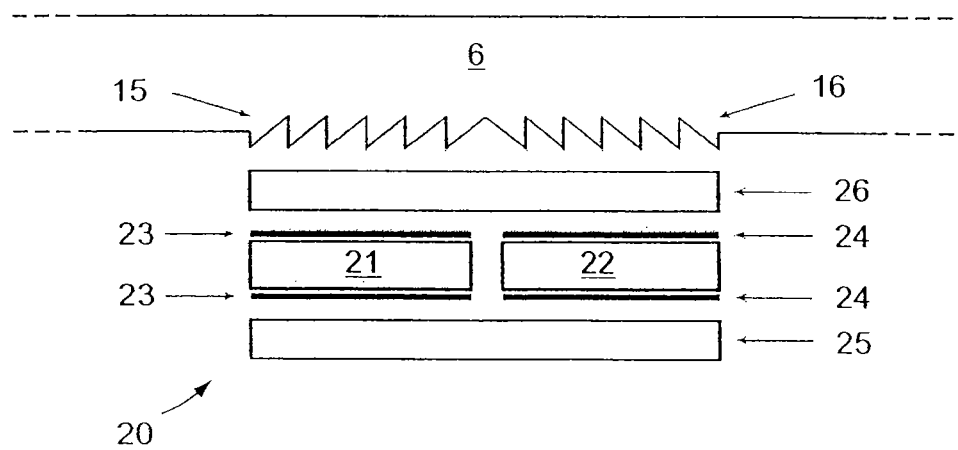
FIG. 4 depicts a modification of the unit of FIG. 1.

FIG. 4 shows an enlarged view of the region in front of the injection grating 8 of a modification of the embodiment shown in FIGS. 1 to 3, with the modification being arranged in the same manner as the display unit of FIGS. 1 to 3 with the exception of the differences as described below. Furthermore, the same elements are designated with the same reference numerals and reference is made to the statements made above in connection with their description. In contrast to the embodiment of FIGS. 1 to 3, a bipartite liquid crystal stop 20 is arranged instead of the liquid crystal element 3 and the $\lambda/2$ plate 5, which stop contains a first and second liquid crystal layer 21, 22, with the first liquid crystal layer 21 being arranged in front of the subgrating 15 and the second liquid crystal layer 22 in front of the second subgrating 16. The two liquid crystal layers comprise respective transparent electrode layers 23, 24 for switching layers 21 and 22. The two liquid crystal layers 21 and 22 with the electrode layers 23 and 24 are arranged between a polarizer 24' which is transparent for TE-polarized light and an analyzer 26 which is transparent for TE-polarized light.

The polarizer 25 is provided for the case that the imaging element 2 emits non-polarized light. When the imaging element 2 emits TE-polarized light, as has been described in connection with FIGS. 1 to 3, polarizer 25 can be omitted. In this case it is also possible that the polarizer 25 is arranged for an improvement of the contrast, as shown in FIG. 4.

The electrode layers 23 and 24 and thus the two liquid crystal layers 21 and 22 are triggered by the control unit 12 in such a way that in the display for the right eye RA the first liquid crystal layer 21 does not change the direction of polarization of the light passing through the same and the second liquid crystal layer 22 turns the polarization of the light passing through the same into TM polarization. As a result, the TE-polarized light impinging on the first subgrating 15 is diffracted into the $m=+1$ diffraction order and no light impinges on the second subgrating 16 as a result of analyzer 26. For the representation for the left eye LA, the first liquid crystal layer 21 turns the polarization from TE to TM and the second polarization layer 22 does not turn the polarization of the passing light, so that no light will impinge on the first subgrating 15 as a result of the analyzer 26 and the TE-polarized light impinging on the second subgrating 16 is diffracted into $m=-1$ diffraction order.

Depending on whether the light is supplied by imaging element 2 to the right or left eye RA, LA, the multicolor image to be represented is generated chromatically in a pre-distorted manner by means of the imaging element 2 as a first or second image in the same manner as in the embodiment of FIGS. 1 to 3 in such a way that the chromatic aberration of the first or second beam path 13, 14 is compensated.

It is understood that a respective mechanically bipartite stop (not shown) can be provided instead of the bipartite liquid crystal stop as described in connection with FIG. 4. In this case it is not necessary that the imaging element 2 emits polarized light. Moreover, the subgratings 15 and 16 can be arranged in such a way that they diffract the impinging light into the +1 or −1 diffraction order, irrespective of the polarization state.

It is understood that it is not mandatory that the stop with its two partial stops for the beam paths 13, 14 is arranged between the collimation lens 4 and the diffractive injection element 8. The partial stops can be arranged at any location between the collimation lens 4 and the respective eye RA, LA of the observer in the first or second beam path 13, 14. It only needs to be ensured that the user is able to perceive only the right and left partial image in a sequential alternating manner over time. The stop can thus also be arranged between the extraction elements 10 and 11 and the eyes RA and LA. It is further possible that the partial stops are arranged between the injection element 8 and the two extraction elements 10 and 11. It is finally possible to arrange the partial stops for the first and second beam path 13 and 14 at different locations in the beam path 13, 14. For example, the partial stop for the first beam path 13 can be provided between collimation lens 4 and diffractive injection element 8 and for the second beam path 14 between diffractive extraction element 11 and the left eye LA.

The described stops 20 jointly form a switching module together with the control unit 12 which switches the first and second beam path as the projection beam path of the display unit 1 in an alternating fashion, so that the display unit has a switchable beam path.

Figure 5:
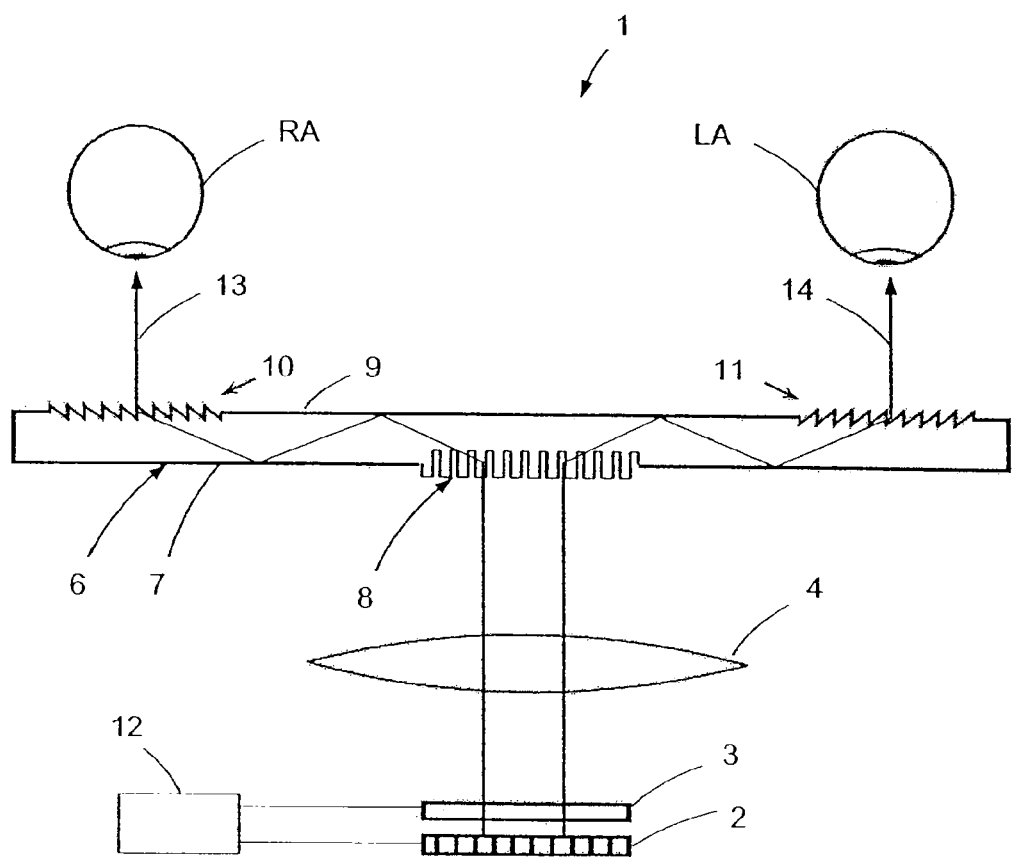
FIG. 5 depicts a further modification of the unit of FIG. 1.

FIG. 5 shows a further embodiment of the display unit in accordance with the invention for binocular representation of a multicolor image. This embodiment differs from the embodiment of FIGS. 1 to 3 in such a way that the $\lambda/2$ plate 5 is omitted. Furthermore, the injection grating 8 is no longer subdivided into two partial gratings, but is arranged as a grating in such a way that TE-polarized light is diffracted into the diffraction order m=+1 and thus to the right in FIG. 5, and TM-polarized light is diffracted into the diffraction order m=−1 and thus to the left in FIG. 5. The liquid crystal element 3 can be used to maintain the TE polarization state of the light of imaging element 2, as already described above, or it can be changed to the TM polarization state. As a result, it is possible to switch over between the first beam path 13 and the second beam path 14 by means of the liquid crystal element 3.

In a further development of the embodiment of FIG. 5 it is possible to arrange the injection element 8 as an electrically switchable diffractive element, as described for example in the US patent application US 2004/0109234 A1. In this case, the electrically switchable grating 8 is switched synchronously with the liquid crystal element 3.

The liquid crystal element is omitted in a modification (not shown) of the embodiment of FIG. 5. The imaging element 2 can emit light of a random polarization state or also non-polarized light. The injection element 8 is arranged as an electrically switchable diffractive element in such a way that light originating from the display is diffracted, depending on the switching state, either into the order m=+1 to the left or the order m=−1 to the right.

Figure 6:
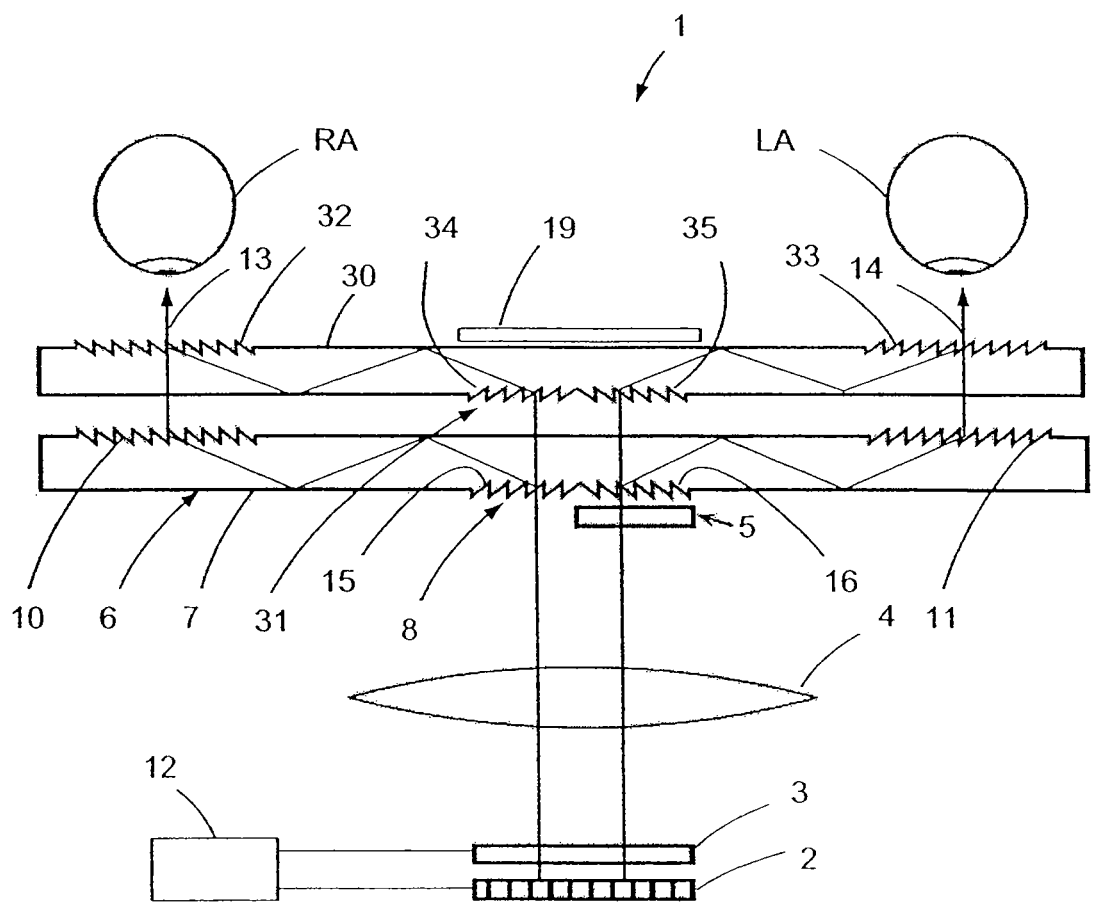
FIG. 6 depicts a further development of the unit of FIG. 1.

FIG. 6 shows a further embodiment of the display apparatus in accordance with the invention, with the same elements being designated with the same reference numerals in comparison with the embodiment of FIGS. 1 to 3. Only the differences will be described below.

In the embodiment of FIG. 6, the plane-parallel plate 6 and the injection element 8 are arranged for the blue/green wavelength range ($\lambda$=465 nm-540 nm). Light in this wavelength range is diffracted depending on the polarization state (TE or TM polarization) to the left or right (in FIG. 6). The light extracted via the extraction elements 10 and 11 passes through a further plane-parallel plate 30 which is arranged between the plane-parallel plate 6 and the eyes RA and LA. The further plane-parallel plate 30 is arranged in substantially the same way as the plane-parallel plate 6. It is arranged for light of the red wavelength range ($\lambda$=615 nm-645 nm) however. Since the injection element 8 does not diffract the light of the red wavelength range, it passes through the plane-parallel plate 6 and impinges on the diffractive injection element 31 of the further plane-parallel plate 30. Depending on the polarization state of the red light, it is diffracted to the left or right (in FIG. 6) and guided means of internal total reflection in the plane-parallel plate up to the diffractive extraction element 32 or 33 which extracts it from the plane-parallel plate 30 to the respective eye RA, LA of the user. The light extracted from the plane-parallel plate 30 is superimposed with the light extracted from the plane-parallel plate 6, so that the user is again able to perceive all colors of the multicolor image to be represented.

Such an arrangement with two plane-parallel plates 36 offers the advantage on the one hand that a larger angle of vision can be made available to the user. Furthermore, the diffractive injection and extraction elements 8, 31, 10, 11, 32 and 33 can be adjusted better to the respective smaller wavelength ranges, so that higher diffraction efficiencies can be achieved.

The injection element 31 of the further plane-parallel plate 30 comprises a first subgrating 34 for the first beam path 13 and a second subgrating 35 for the second beam path 14. The gratings 8 and 15, 16, as well as the extraction elements 10 and 11, have a common groove spacing $g_{GB}$. The gratings 31 and 34, 35, as well as the extraction elements 32 and 33, have a common groove spacing $g_R$. The two groove spacings $g_{GB}$ and $g_R$ can be different. $g_{GB} < g_R$ preferably applies. Furthermore, the two subgratings 15 and 16 of the injection element 8 and the two subgratings 34 and 35 of the injection element 31 are identical apart from their twisting about the surface normal of the support plate 6, 30 by 180°.

Figure 7:
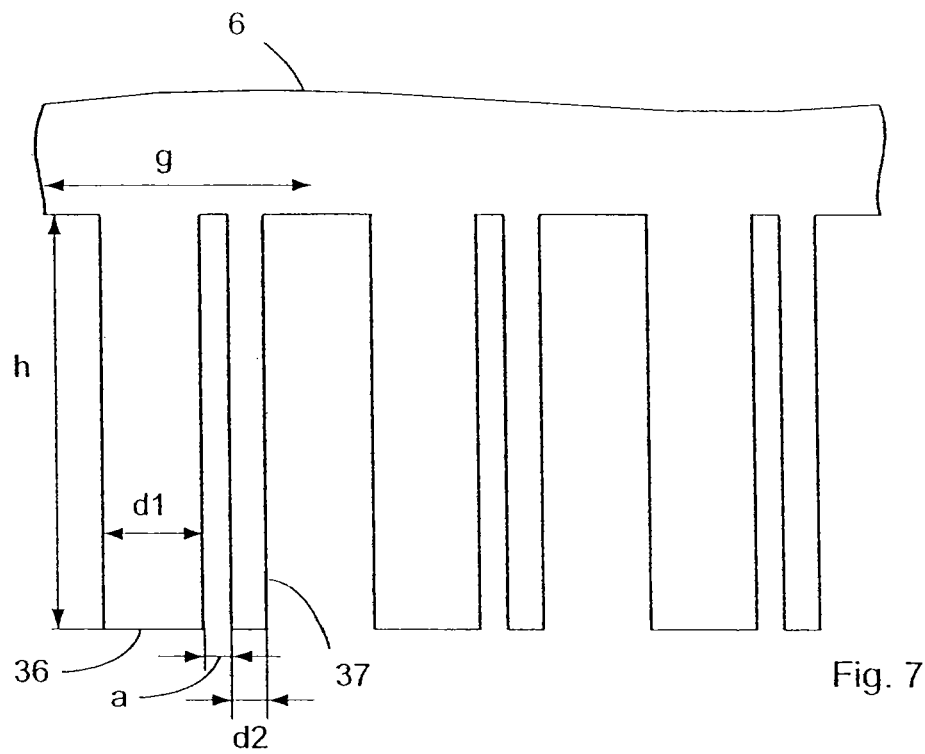
FIG. 7 depicts a schematic enlarged view of a profile for the diffractive elements, and FIG. 8 schematically depicts a further profile for the diffractive elements.

The subgratings 15, 16 and 34, 35 as well as the extraction elements 10, 11 and 32 and 33 can each have the grating profile as schematically shown in FIG. 7. Within the grating period g (groove spacing g) there are two webs 36, 37 of differing thickness d1 and d2 which extend perpendicularly, whose web height h is the same and who are spaced from one another by the length a. The injection element 8, which is arranged for the green and blue range of lengths, has the following data: $g_{GB}$=400 nm, h=635 nm, d1=166 nm, d2=58 nm and a=42 nm. The injection efficiency for the TE polarization into the first diffraction order is 51% and for TM polarization 1.6% at $\lambda$=525 nm and 51% for TE polarization and 5.9% for TM polarization at $\lambda$=475 nm and perpendicular incidence.

The injection element 31, which is arranged for the red wavelength range, has the following data: $g_R$=510 nm, h=770 nm, d1=193 nm, d2=62 nm and a=53 nm. The injection efficiency for the TE polarization into the first diffraction order is 64% and for TM polarization 2.6% at $\lambda$=630 nm and perpendicular incidence.

Figure 8:
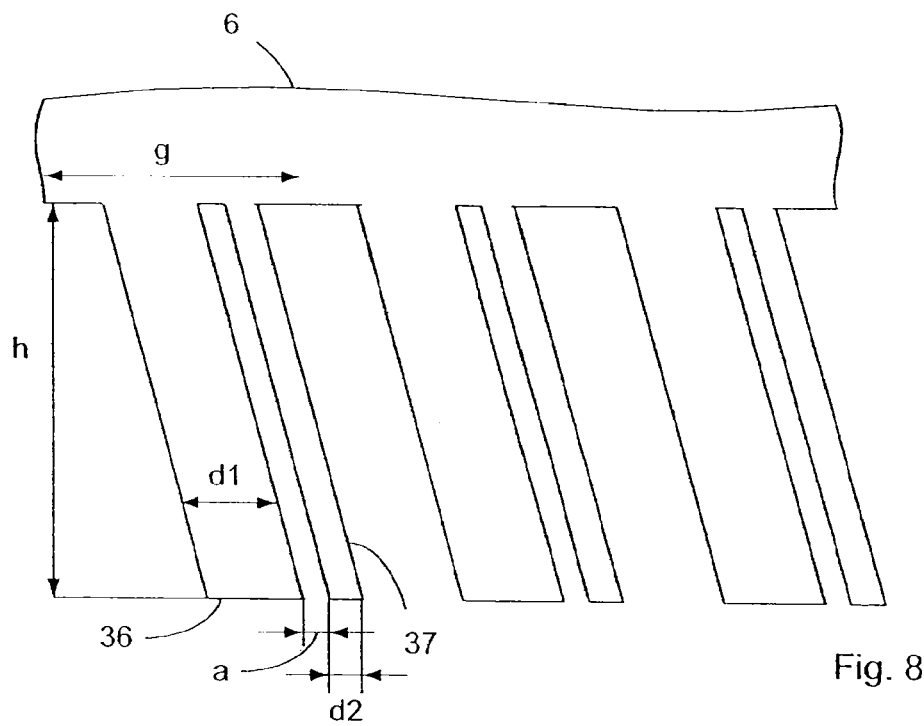

As is shown in a further development of FIG. 8, the webs 36, 37 can also be provided with an inclined arrangement. The distance parameter a can also assume the value 0 μm, so that the two webs will merge with one another.

In the embodiments as described above, the injection elements 8 and 31 as well as the extraction elements 10, 11, 32 and 33 are each arranged as transmissive diffractive elements. It is also possible however to arrange at least one of these elements as a reflective diffractive element. When the injection element 8 is arranged as a reflective element for example, it is arranged in the embodiment of FIG. 1 on the rear side 9 of the planar plate 6.

It is further possible to arrange the injection and extraction elements 8, 31, 10, 11, 32 and 33 on the same side as the planar plate 6, 30. In this case, the injection elements 8 and 30 and the eyes RA and LA of the user are disposed on the same side of the planar plate 6 and 30.

The use of the described planar plate 6 and its combinations 6 and 30 offers the further advantage that the exit pupil of the projection lens system which comprises the collimation lens 4 and the planar plate 6 or planar plates 6 and 30 is larger in the plane of the drawing (of FIG. 1 for example) than the exit pupil of the collimation lens 4. In order to achieve a respective enlargement of the exit pupil of the projection lens system perpendicular to the plane of the drawing, a suitably arranged diffractive element can be arranged for example in the respective beam paths 13 and 14 and within the planar plate 6, as described for example in FIGS. 15 and 16 of the publication of T. Levola: "Diffractive optics for virtual reality displays", Journal of the SID 14/5 (2006), pages 467-475.

The described embodiments of the display apparatus 1 are preferably arranged as an HMD unit (head-mounted-display unit) and preferably comprise a head mounting which is arranged in the manner of a spectacle frame for example. All other types of a head mounting are possible such as a helmet, cap, etc. The display unit 1 is preferably arranged in such a way that the user can perceive a virtual image of the multicolor image generated by means of the imaging element 2.

A stereoscopic representation of the multicolor image can be performed with the display apparatus in accordance with the invention as a result of the successive representation of the images for the left and right eye, such that stereoscopic images of the multicolor image are generated by the imaging element in an alternating manner pre-distorted by color. The stereoscopic images can originate from a stereo recording for example, so that as a result of the pre-distortion by color in accordance with the invention the desired stereoscopic images which are pre-distorted by color can be generated and displayed.

The invention claimed is:

1. A display unit for binocular representation of a multicolor image, comprising:
    a single imaging element, by which the multicolor image that is to be represented is generated;
    a projection lens system including a collimation lens;
    a transparent substrate located after the collimation lens including a diffractive injection element and a first and a second diffractive extraction elements arranged at a distance from each other;
    a control unit coupled to and triggering the imaging element;
    the display unit defining a first beam path which extends from the imaging element to the first extraction element via the collimation lens and the injection element through the substrate, and via the first extraction element out of the substrate, and a second beam path that extends from the imaging element to the second extraction element via the collimation lens and the injection element through the substrate, and via the second extraction element out of the substrate, with different chromatic aberrations being generated in the first and second beam path because of the injection element and the first and second extraction elements;
    wherein the control unit triggers the imaging element such that the imaging element generates in a temporal successive manner the image to be displayed for the first beam path and the second beam path as a first image and second image, respectively, in a pre-distorted manner, opposite of the chromatic aberration of the respective beam path, such that the chromatic aberration generated in the respective beam path is compensated when the first and second image is displayed; and
    wherein the display unit further comprises a switching module that operates in temporal synchrony with the first and second image being generated such that a user can see the first image only via the first beam path and the second image only via the second beam path.

2. The display unit according to claim 1, wherein light from the imaging element is guided in the first and second beam path in the substrate each by total internal total reflection.

3. The display unit according to claim 1, wherein the switching module comprises a first and second triggerable stop in each of the first and second beam path, the first and second stop being switched over synchronously to the generation of the respective first and second image between blocking and passing.

4. The display unit according to claim 3, wherein at least one of the first and second stops causes the switching over by changing the polarization state of the light of the first or second image.

5. The display unit according to claim 1, wherein the switching module comprises a polarization element located after the imaging element and which maintains the first polarization state of light coming from the imaging element or changes to a second polarization state, and a half wave plate arranged in one of the first or second beam path between the imaging element and the injection element, and the injection element being arranged such that the injection element transfers only light of the first or second polarization state into the respective beam path.

6. The display unit according to claim 1, wherein the switching module comprises a polarization element located after the imaging element and the switching module operates such that the polarization state of the first image is different from the polarization state of the second image, and wherein the injection element is arranged such that only light of the first polarization state is transferred into the first beam path and only light of the second polarization state into the second beam path.

7. The display unit according to claim 1, wherein the substrate comprises a substantially planar plate.

8. A displaying method for binocular representation of a multicolor image for a display unit, comprising:
    utilizing a display unit comprising
        a single imaging element, by which the multicolor image that is to be represented is generated;
        a projection lens system including a collimation lens;
        a transparent substrate located after the collimation lens including a diffractive injection element and a first and a second diffractive extraction elements arranged at a distance from each other;
        a control unit coupled to and triggering the imaging element;
        the display unit defining a first beam path which extends from the imaging element to the first extraction element via the collimation lens and the injection element through the substrate, and via the first extraction element out of the substrate, and a second beam path that extends from the imaging element to the second extraction element via the collimation lens and the injection element through the substrate, and via the second extraction element out of the substrate, with different chromatic aberrations being generated in the first and second beam path because of the injection element and the extraction elements;
    triggering the imaging element to generate the image to be displayed for the first beam path and the second beam path in temporal succession as a first image and second image, respectively, in a pre-distorted manner that is opposite of the chromatic aberration of the respective beam path such that the chromatic aberration generated in the respective beam path is compensated when the first and second image is displayed, and
    temporally synchronizing with the first and second image being generated, such that a user can see the first image only via the first beam path and the second image only via the second beam path.

9. The method according to claim 8, further comprising guiding light in the first and second beam path in the substrate each by total internal reflection.

10. The method according to claim 8, further comprising arranging a first and second triggerable stop in each of the first and second beam path; and
    switching the first and second stop over synchronously to the generation of the respective first and second image between blocking and passing.

11. The method according to claim 10, wherein at least one of the first and second triggerable stops causes the switching over by changing the polarization state of the light of the first or second image.

12. The method according to claim 8, further comprising alternately maintaining the first polarization state of the light coming from the imaging element with a polarization element arranged after the imaging element or changing to a second polarization state with the polarization element, and arranging a half wave plate in one of the two beam paths between the imaging element and the injection element, with the injection element being arranged such that it transfers only light of the first or second polarization state into the respective beam path.

13. The method according to claim 8, further comprising arranging a polarization element after the imaging element, wherein the polarization element operates such that the polarization state of the first image differs from the polarization state of the second image, and arranging the injection element being such that only light of the first polarization state is transferred in the first beam path and only light of the second polarization state in the second beam path.

14. The method according to claim 8, further comprising utilizing a planar plate as the substrate.

* * * * *